(12) United States Patent  
Deguchi et al.

(10) Patent No.: US 8,135,373 B2  
(45) Date of Patent: Mar. 13, 2012

(54) WIRELESS COMMUNICATION APPARATUS

(75) Inventors: Jun Deguchi, Yokohama (JP); Shouhei Kousai, Yokohama (JP); Daisuke Miyashita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 489 days.

(21) Appl. No.: 12/407,957

(22) Filed: Mar. 20, 2009

(65) Prior Publication Data

US 2009/0253396 A1 Oct. 8, 2009

(30) Foreign Application Priority Data

Mar. 24, 2008 (JP) ................................. 2008-75773

(51) Int. Cl.  
*H04B 15/00* (2006.01)

(52) U.S. Cl. ........................... 455/313; 455/323

(58) Field of Classification Search .................. None  
See application file for complete search history.

(56) References Cited

U.S. PATENT DOCUMENTS

| | | | |
|---|---|---|---|
| 4,322,856 A | 3/1982 | Ohta et al. | |
| 5,678,222 A | 10/1997 | Hornak et al. | |
| 7,158,586 B2 * | 1/2007 | Husted | 375/324 |
| 7,394,878 B2 * | 7/2008 | Nysen et al. | 375/343 |
| 2004/0038652 A1 * | 2/2004 | Khlat et al. | 455/130 |
| 2004/0113833 A1 | 6/2004 | Lee | |

OTHER PUBLICATIONS

Bertan Bakkaloglu et al., "A 1.5-V Multi-Mode Quad-Band RF Receiver for GSM/EDGE/CDMA2K in 90-nm Digital CMOS Process", IEEE Journal of Solid-State Circuits, vol. 41, No. 5, May 2006, pp. 1149-1159.

* cited by examiner

*Primary Examiner* — Tuan T Lam  
(74) *Attorney, Agent, or Firm* — Oblon, Spivak, McClelland, Maier & Neustadt, L.L.P.

(57) ABSTRACT

A wireless communication apparatus includes a local oscillator that generates a plurality of LO (Local Oschillation) signals corresponding to frequencies of a plurality of input RF (Radio Frequency) signals, an accumulator that accumulates the plurality of LO signals generated by the local oscillator to generate an accumulated signal, a mixer that mixes the plurality of RF signals and the accumulated signal generated by the accumulator and to generate a plurality of base band signals, and a first signal processing unit that executes a signal process with respect to the plurality of base band signals generated by the mixer.

12 Claims, 4 Drawing Sheets

WIRELESS COMMUNICATION APPARATUS

CROSS-REFERENCE TO RELATED APPLICATION

This application is based upon and claims the benefit of priority from the prior Japanese Patent Application No. 2008-75773, filed on Mar. 24, 2008; the entire contents of which are incorporated herein by reference.

BACKGROUND OF THE INVENTION

1. Field of the Invention

The present invention relates to a wireless communication apparatus, and more particularly, to a wireless communication apparatus including a mixer for reception that down-converts RF (Radio Frequency) signals of a plurality of frequency bands at the same time.

2. Related Art

In recent years, a multi-band-type mobile phone using a GSM (Global System for Mobile-communications) scheme or a WCDMA (Wideband Code Division Multiple Access) scheme has been widely used (see "A1.5-V Multi-Mode Quad-Band RF Receiver for GSM/EDGE/CDMA2K in 90-nm Digital CMOS Process", IEEE Journal of Solid-State Circuits, vol. 41, No. 5, PP. 1149-1159, 2006.).

Meanwhile, a recent mobile phone has been developed as not only a communication terminal but also a multifunctional multimedia terminal that can receive an electric wave to distribute multimedia contents, such as TV/AM/FM.

Now, the inclination of the multi-banded and multifunctional wireless communication apparatus has been accelerated and an LSI for wireless communication that can simultaneously transmit and receive various frequency band signals has been required. As instances of functions that are realized by the wireless communication apparatus, the following instances may be exemplified.

First, when a user simultaneously receives different programs and records the different programs while viewing programs of one-segment broadcasting or terrestrial digital TV broadcasting using a portable terminal or a personal computer, the user transmits and receives voice information of the viewing program by a headset using Bluetooth.

Second, while viewing programs of TV broadcasting, the user simultaneously downloads a large capacity of files through a wireless LAN.

However, since the wireless communication apparatus according to the related art switches a frequency band used for transmitting and receiving with a time division and uses the frequency band, a frequency band that can be used for transmitting and receiving at a time is restricted to one. For this reason, functions of "simultaneous transmission and reception", "simultaneous transmission", and "simultaneous reception" of a plurality of frequency band signals should be realized in order to realize the instances using the wireless communication apparatus according to the related art.

In order to realize simultaneous reception of the plurality of frequency band signals, the wireless communication apparatus according to the related art includes a plurality of receivers corresponding to the individual frequency bands to be disposed in parallel to each other. Thereby, the function of "simultaneous reception" of the plurality of frequency band signals is realized.

However, in the wireless communication apparatus where the plurality of receivers is disposed in parallel to each other, there is a problem in that chip area enlarges or manufacturing cost increases. When the problem is considered, it is required to maximally share circuit blocks between the individual frequency bands.

SUMMARY OF THE INVENTION

According to an aspect of the present invention, there is provided a wireless communication apparatus comprising:

a local oscillator that generates a plurality of LO (Local Oschillation) signals corresponding to frequencies of a plurality of input RF (Radio Frequency) signals;

an accumulator that accumulates the plurality of LO signals generated by the local oscillator to generate an accumulated signal;

a mixer that mixes the plurality of RF signals and the accumulated signal generated by the accumulator and to generate a plurality of base band signals; and a first signal processing unit that executes a signal process with respect to the plurality of base band signals generated by the mixer.

According to another aspect of the present invention, there is provided a wireless communication apparatus comprising:

a local oscillator that generates a plurality of LO signals corresponding to frequencies of a plurality of input RF signals;

a code generating unit that generates a code group including a plurality of codes;

a first multiplier that multiplies the code group generated by the code generating unit and the plurality of LO signals generated by the local oscillator to generate a plurality of first multiplication signals;

an accumulator that accumulates the plurality of first multiplication signals generated by the first multiplier to generate an accumulated signal;

a mixer that mixes the plurality of RF signals and the accumulated signal generated by the accumulator to generate a plurality of base band signals;

a first signal processing unit that executes a signal process with respect to the plurality of base band signals generated by the mixer;

a second multiplier that multiplies the plurality of base band signals processed by the first signal processing unit and the code group to generate second multiplication signals; and a second signal processing unit that executes a signal process with respect to the second multiplication signals generated by the second multiplier.

DETAILED DESCRIPTION OF THE INVENTION

Hereafter, preferred embodiments of the present invention will be described in detail with reference to the accompanying drawings. The embodiments that will be described below are only exemplary and do not restrict a technical range of the present invention.

First Embodiment

First, a first embodiment of the present invention will be described.

Figure 1:
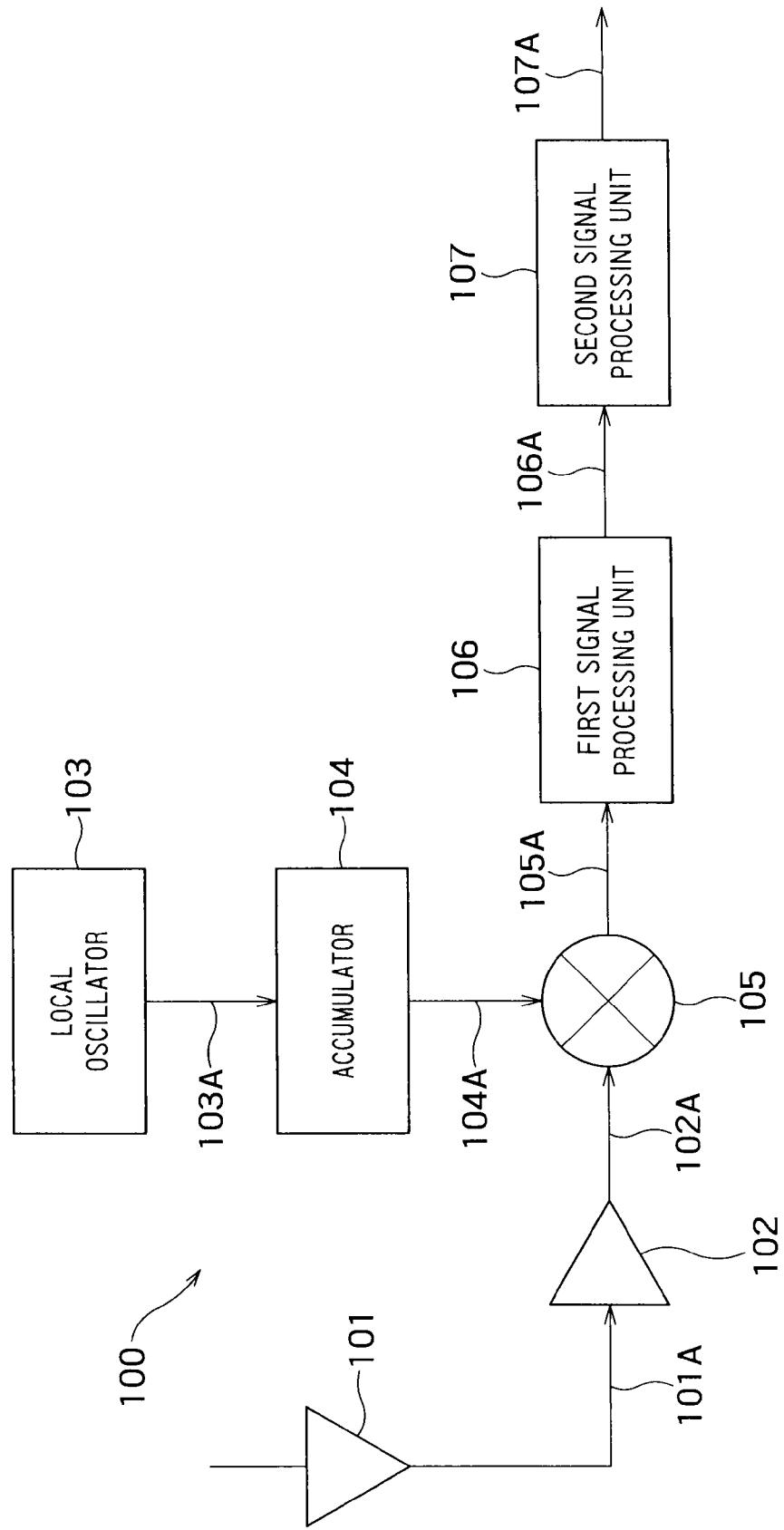
FIG. 1 is a block diagram illustrating the configuration of a wireless communication apparatus 100 according to a first embodiment of the present invention.

FIG. 1 is a block diagram illustrating the configuration of a wireless communication apparatus 100 according to a first embodiment of the present invention.

The wireless communication apparatus 100 according to the first embodiment of the present invention includes a receiving antenna 101, a LNA (Low Noise Amplifier) 102, a local oscillator 103, an accumulator 104, a mixer 105, a first signal processing unit 106, and a second signal processing unit 107.

Reference numeral 101A denotes a plurality of RF (radio frequency) signals, reference numeral 102A denotes RF input signals of a plurality of channels (for example, Ich and Qch), reference numeral 103A denotes a plurality of LO (local oscillation) signals, reference numeral 104A denotes LO input signals of a plurality of channels, reference numeral 105A denotes BB (base band) signals of a plurality of channels, and reference numerals 106A and 107A denote processed BB signals.

The antenna 101 receives the plurality of RF signals 101A from an external base station (not shown) and simultaneously outputs the plurality of RF signals 101A to the LNA 102.

The LNA 102 amplifies the plurality of RF signals 101A output from the antenna 101 to generate the RF input signals 102A of the plurality of channels, and outputs the RF input signals 102A of the plurality of channels to the mixer 105.

The local oscillator 103 generates the plurality of LO signals 103A that correspond to the RF input signals 102A of the plurality of channels output from the LNA 102, and outputs the plurality of LO signals 103A to the accumulator 104.

The accumulator 104 accumulates the plurality of LO signals 103A output from the local oscillator 103 to generate the LO input signals (accumulated signals) 104A of the plurality of channels, and outputs the LO input signals 104A of the plurality of channels to the mixer 105.

The mixer 105 mixes the RF input signals 102A of the plurality of channels output from the LNA 102 and the LO input signals 104A of the plurality of channels output from the accumulator 104, down-converts the RF input signals 102A of the plurality of channels at the same time to generate the BB signals 105A of the plurality of channels, and outputs the BB signals 105A of the plurality of channels to the first signal processing unit 106.

With respect to the BB signals 105A of the plurality of channels that are output from the mixer 105, the first signal processing unit 106 executes an amplifying process or an attenuating process to adjust signal levels in a dynamic range (input enabled range) of the second signal processing unit 107, or executes a filtering process to remove an unnecessary noise or an interfering wave. The first signal processing unit 106 outputs the processed BB signals 106A of the plurality of channels to the second signal processing unit 107.

With respect to each of the BB signals 106A of the plurality of channels that are processed by the first signal processing unit 106, the second signal processing unit 107 adjusts a signal level or executes a filtering process to remove an unnecessary noise or an interfering wave. The second signal processing unit 107 outputs the processed BB signals 107A of the plurality of channels to a device (not shown) at a rear stage.

The first signal processing unit 106, the second signal processing unit 107, and the device (not shown) at the rear stage, which is connected to the wireless communication apparatus 100 of the first embodiment of the present invention, are devices, which include a VGA (Variable Gain Amplifier) that executes amplifying process and attenuating process to adjust signal levels, a filter that executes a filtering process to remove an unnecessary noise or an interfering wave, an AD converter that converts an analog signal into a digital signal, and a digital signal processing device such as an FFT (Fast Fourier Transformation) that executes various digital signal processes. For example, the first signal processing unit 106 is an analog VGA, an analog filter, and an AD converter, the second signal processing unit 107 is a digital VGA and a digital filter, and the device at the rear stage is a digital signal processing device. In the first embodiment of the present invention, the configurations of the first signal processing unit 106, the second signal processing unit 107, and the device at the rear stage are not limited to the above configurations.

Next, an operational principle of the mixer 105 shown in FIG. 1 will be described. In the description below, in order to describe a simple operational principle, it is assumed that the RF input signals 102A and the LO input signals 104A of the two channels are input to the mixer 105 shown in FIG. 1.

In this case, it is assumed that RF1 and RF2 are the RF input signals 102A, LO1 and LO2 are the LO input signals 104A, A1 and A2 are amplitudes of the RF input signals 102A (RF1 and RF2), B1 and B2 are amplitudes of the LO input signals 104A (LO1 and LO2), ωLO1 and ωLO2 are frequencies of the LO input signals 104A (LO1 and LO2), and ωBB1 and ωBB2 are frequencies of the BB signals 105A.

At this time, if it is assumed that the RF input signal 102A and the LO input signal 104A that are input to the mixer 105 are $V_{in}$ and $V_{LO}$, respectively, the RF input signal $V_{in}$ and the LO input signal $V_{LO}$ are represented by the following Equations 1 and 2.

$$V_{in} = A_1 \sin(\omega_{LO1}+\omega_{BB1})t + A_2 \sin(\omega_{LO2}+\omega_{BB2})t \quad \text{[Equation 1]}$$

$$V_{LO} = B_1 \sin(\omega_{LO1})t + B_2 \sin(\omega_{LO2})t \quad \text{[Equation 2]}$$

A basic function of the mixer 105 is a multiplication of signals ($V_{in} \times V_{LO}$), and an output signal $V_{BB}$ of the mixer 105 is represented by the following Equation 3 to extract a down-converted frequency component.

$$V_{BB} = \frac{A_1 B_1}{2} \cos(\omega_{BB1})t + \frac{A_2 B_2}{2} \cos(\omega_{BB2})t \quad \text{[Equation 3]}$$

From Equations 1 to 3, it can be seen that frequency band signals of the two channels can be simultaneously down-converted by simultaneously inputting the LO input signals 104A (LO1 and LO2) of the two channels to one mixer 105.

Further, it can be seen that gains with respect to the two RF input signals 102A (RF1 and RF2) are B1 and B2, respectively. That is, since the local oscillator 103 controls the amplitudes B1 and B2 of the LO input signals 104A, it is possible to individually and selectively control gains with respect to the RF input signals 102A (RF1 and RF2).

The result is also applicable to the case of using frequencies of three channels or more as well as the case of using the frequencies of the two channels.

Figure 2:
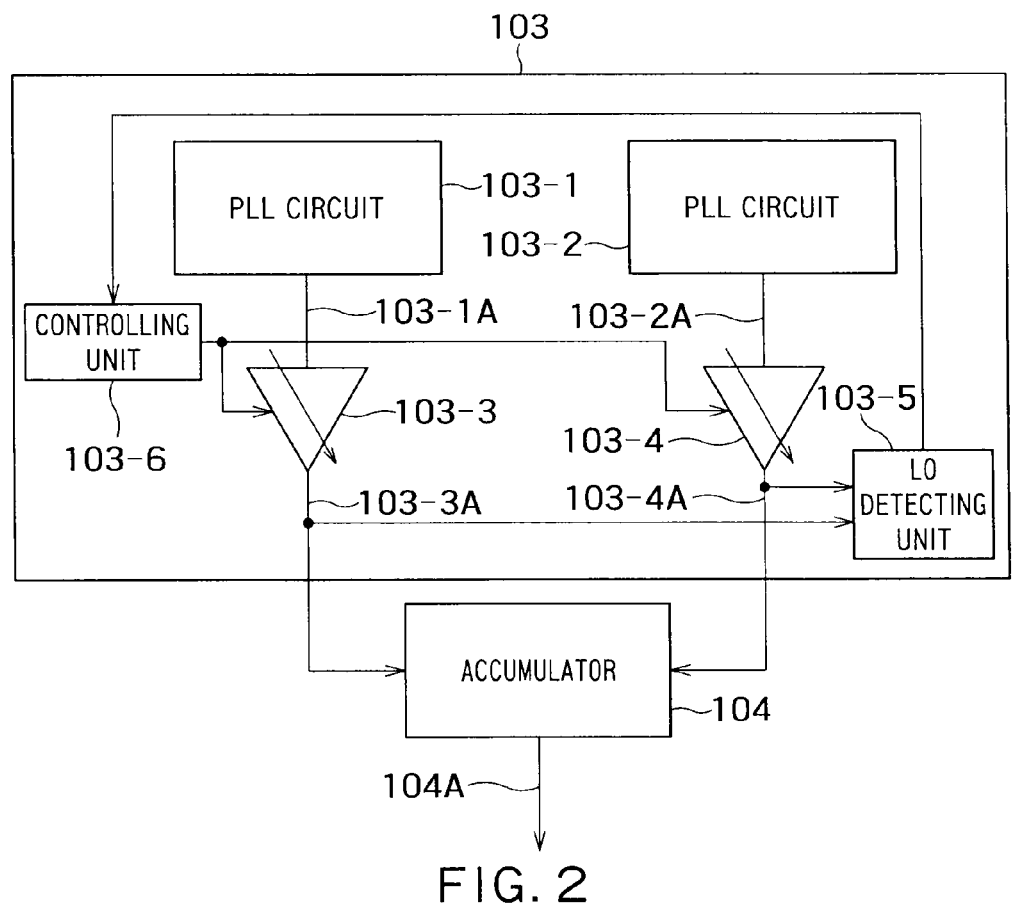
FIG. 2 is a block diagram illustrating the configuration of a local oscillator 103 shown in FIG. 1.

FIG. 2 is a block diagram illustrating the configuration of the local oscillator 103 shown in FIG. 1.

The local oscillator 103 shown in FIG. 1 includes a plurality of PLL (phase locked loop) circuits 103-1 and 103-2, a plurality of VGAs 103-3 and 103-4 that are connected to the PLL circuits 103-1 and 103-2, respectively, an LO detecting unit 103-5 that is connected to the VGAs 103-3 and 103-4, and a controlling unit 103-6 that is connected to the VGAs 103-3 and 103-4 and the LO detecting unit 103-5.

Reference numerals 103-1A and 103-2A denote frequency signals and reference numerals 103-3A and 103-4A denote LO signals.

The PLL circuits 103-1 and 103-2 synchronizes input signals with a reference frequency to generate the plurality of frequency signals 103-1A and 103-2A, and outputs the plurality of frequency signals 103-1A and 103-2A to the VGA 103-3. Each of the PLL circuits 103-1 and 103-2 uses a different reference frequency. For example, the PLL circuit 103-1 generates the frequency signal 103-1A using a first reference frequency with respect to a predetermined input signal, and outputs the frequency signal 103-1A to the VGA 103-3. Further, the PLL circuit 103-2 generates the frequency signal 103-2A using a second reference frequency different from the first reference frequency with respect to a predetermined input signal, and outputs the frequency signal 103-2A to the VGA 103-4.

The VGA 103-3 amplifies the frequency signal 103-1A output from the PLL circuit 103-1 to generate the LO signal 103-3A, and outputs the LO signal 103-3A to the accumulator 104. The VGA 103-3 outputs an output signal amplitude to the LO detecting unit 103-5. The VGA 103-3 operates on the basis of a control signal that will be described in detail below.

The VGA 103-4 amplifies the frequency signal 103-2A output from the PLL circuit 103-2 to generate the LO signal 103-4A, and outputs the LO signal 103-4A to the accumulator 104. The VGA 103-4 outputs an output signal amplitude to the LO detecting unit 103-5. The VGA 103-4 operates on the basis of a control signal that will be described in detail below.

The LO detecting unit 103-5 generates an LO detection signal according to the output signal amplitude output from the VGAs 103-3 and 103-4, and outputs the LO detection signal to the controlling unit 103-6.

The controlling unit 103-6 generates a control signal that controls gains of the VGAs 103-3 and 103-4 in accordance with the LO detection signal output from the LO detecting unit 103-5, and outputs the control signal to the VGAs 103-3 and 103-4.

In the first embodiment of the present invention, the number of pairs of PLL circuit and VGA is not limited to two, but may be two or more.

Figure 3:
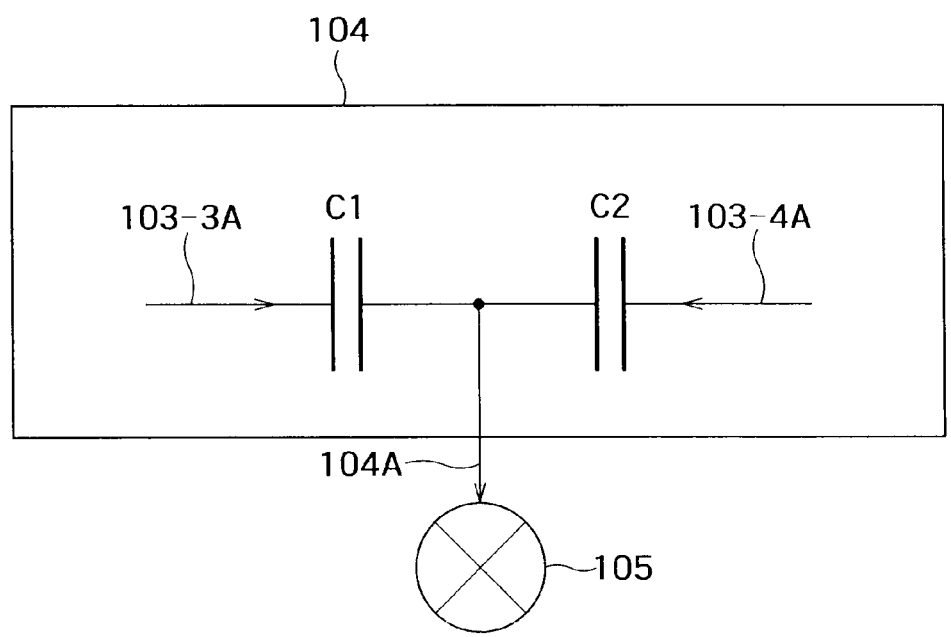
FIG. 3 is a schematic diagram illustrating an example of the configuration of an accumulator 104 shown in FIG. 1.

FIG. 3 is a schematic diagram illustrating an example of the configuration of an accumulator 104 shown in FIG. 1.

The accumulator 104 shown in FIG. 1 accumulates the LO signal 103-3A output from the VGA 103-3 and the LO signal 103-4A output from the VGA 103-4 using capacitors C1 and C2 connected to the mixer 105 to generate the LO input signals 104A of the plurality of channels.

In the first embodiment of the present invention, the controlling unit 103-6 may control the gains of the VGAs 103-3 and 103-4 in accordance with any one of the LO signal amplitude, the RF signal amplitude, and the BB signal amplitude or a combination thereof.

Further, in the first embodiment of the present invention, a signal that is related to the BB signal amplitude may be a digital signal which is the AD-converted BB signal. For example, the controlling unit 103-6 controls the gains of the VGAs 103-3 and 103-4 in accordance with magnitude of the LO signal amplitude, such that the LO signal amplitude becomes constant without depending on a process, a power supply voltage, and a temperature. As a result, a gain of the mixer 105 can become constant.

According to the first embodiment of the present invention, since the RF input signals 102A and the LO input signals 104A of the plurality of channels are simultaneously input to one mixer 105, it is possible to down-convert the RF input signals 102A of the plurality of channels at the same time.

According to the first embodiment of the present invention, since the local oscillator 103 controls the amplitudes of the LO input signals 104A of the plurality of channels input to the mixer 105, it is possible to perform gain control having frequency selectivity for every channel.

Second Embodiment

Next, a second embodiment of the present invention will be described. The first embodiment of the present invention is an example of the local oscillator that includes the PLL circuits, but the second embodiment of the present invention is an example of a local oscillator that includes an oscillator. The same contents as the first embodiment of the present invention are not described.

Figure 4:
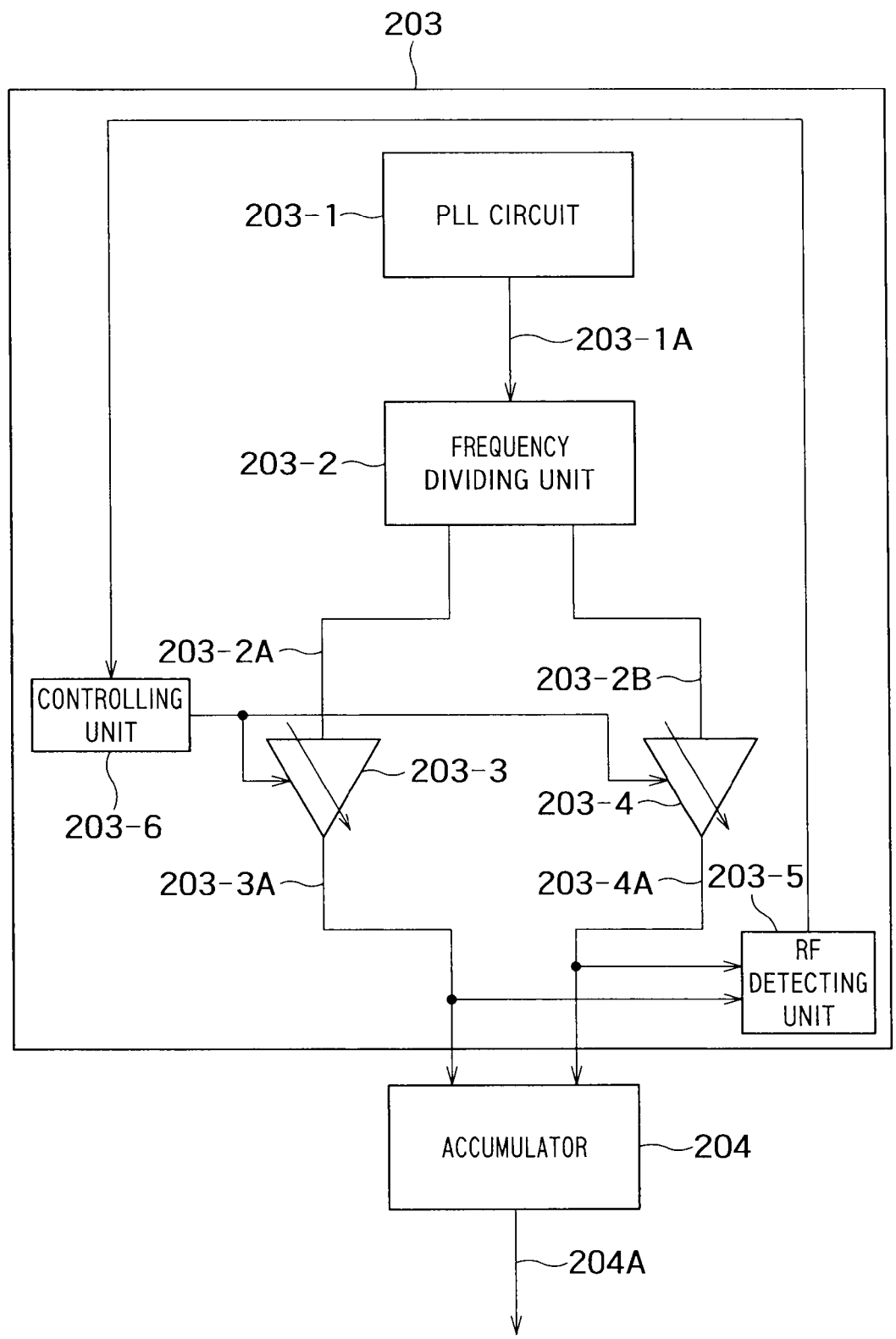
FIG. 4 is a block diagram illustrating the configuration of a local oscillator 203 according to a second embodiment of the present invention.

FIG. 4 is a block diagram illustrating the configuration of a local oscillator 203 according to a second embodiment of the present invention.

The local oscillator 203 according to the second embodiment of the present invention includes an oscillator 203-1, a frequency dividing unit 203-2, VGAs 203-3 and 203-4, an RF detecting unit 203-5, and a controlling unit 203-6.

Reference numeral 203-1A denotes a frequency signal, reference numerals 203-2A and 203-2B denote divided frequency signals, and reference numerals 203-3A and 203-4A denote LO signals.

The oscillator 203-1 generates a frequency signal 203-1A having a predetermined frequency and outputs the frequency signal 203-1A to the frequency dividing unit 203-2.

The frequency dividing unit 203-2 divides the frequency signal 203-1A output from the oscillator 203-1 to generate the divided frequency signals 203-2A and 203-2B, outputs the divided frequency signal 203-2A to the VGA 203-3, and outputs the divided frequency signal 203-2B to the VGA 203-4.

The VGA 203-3 amplifies the divided frequency signal 203-2A output from the frequency dividing unit 203-2 to generate the LO signal 203-3A, and outputs the LO signal 203-3A to the accumulator 204. The VGA 203-3 outputs the RF signal amplitude to the RF detecting unit 203-5. The VGA 203-3 operates on the basis of a control signal that will be described in detail below.

The VGA 203-4 amplifies the divided frequency signal 203-2B output from the frequency dividing unit 203-2 to generate the LO signal 203-4A, and outputs the LO signal 203-4A to the accumulator 204. The VGA 203-4 outputs the RF signal amplitude to the RF detecting unit 203-5. The VGA 203-4 operates on the basis of a control signal that will be described in detail below.

The RF detecting unit 203-5 generates the RF detection signal according to the RF signal amplitude output from the VGAs 203-3 and 203-4 and outputs the RF detection signal to the controlling unit 203-6.

The controlling unit 203-6 generates a control signal that controls gains of the VGAs 203-3 and 203-4 in accordance with the RF detection signal output from the RF detecting unit 203-5, and outputs the control signal to the VGAs 203-3 and 203-4.

In the second embodiment of the present invention, instead of the frequency dividing unit 203-2, a frequency multiplier, which performs frequency multiplication on the oscillation signal 203-1A output from the oscillator 203-1 to generate a frequency multiplication signal, may be used.

In the second embodiment of the present invention, the controlling unit 203-6 may control the gains of the VGAs 203-3 and 203-4 in accordance with any one of the LO signal amplitude, the RF signal amplitude, and the BB signal amplitude or a combination thereof.

Further, in the second embodiment of the present invention, a signal that is related to the BB signal amplitude may be a digital signal which is the AD-converted BB signal. For example, the controlling unit 203-6 controls the gains of the VGAs 203-3 and 203-4 in accordance with magnitude of the LO signal amplitude, such that the LO signal amplitude becomes constant without depending on a process, a power supply voltage, and a temperature. As a result, a gain of the mixer 205 can become constant.

According to the second embodiment of the present invention, even in the case of using a combination of the oscillator and the frequency dividing unit or the frequency multiplier, the same effect as the first embodiment of the present invention can be achieved.

Third Embodiment

Next, a third embodiment of the present invention will be described. The first embodiment of the present invention is an example of the case where the plurality of LO signals are accumulated. However, the third embodiment of the present invention is an example of the case where the plurality of LO signals are multiplied by a predetermined code and then accumulated. The same contents as the first and second embodiments of the present invention are not described.

Figure 5:
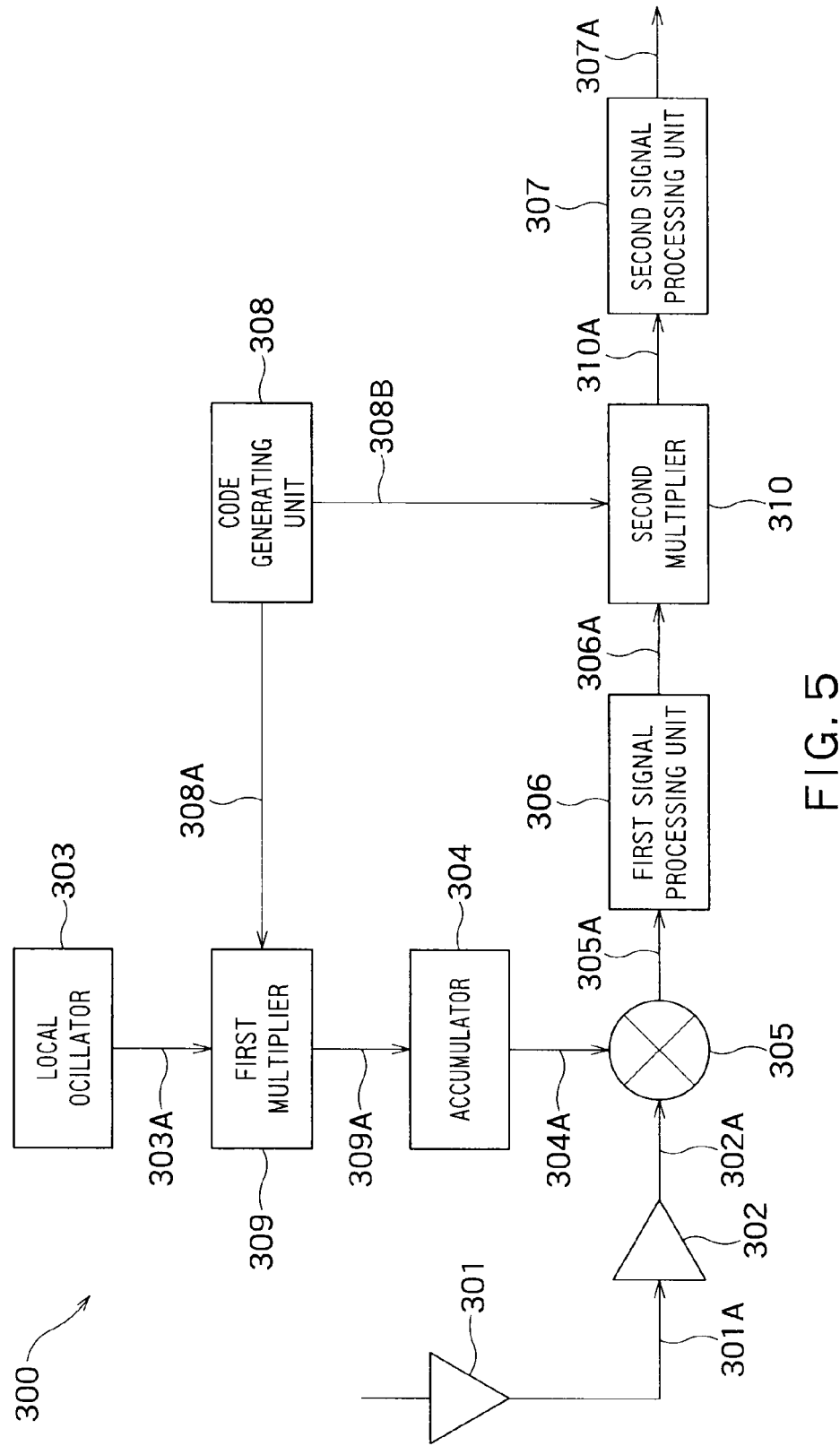
FIG. 5 is a block diagram illustrating the configuration of a wireless communication apparatus 300 according to a third embodiment of the present invention.

FIG. 5 is a block diagram illustrating the configuration of a wireless communication apparatus 300 according to a third embodiment of the present invention.

The wireless communication apparatus 300 according to the third embodiment of the present invention includes a receiving antenna 301, a LNA 302, a local oscillator 303, an accumulator 304, a mixer 305, a first signal processing unit 306, a second signal processing unit 307, a code generating unit 308, a first multiplier 309, and a second multiplier 310.

Reference numeral 301A denotes a plurality of RF signals, reference numeral 302A denotes RF input signals of a plurality of channels (for example, Ich and Qch), reference numeral 303A denotes a plurality of LO signals, reference numeral 304A denotes LO input signals of a plurality of channels, reference numeral 305A denotes BB signals of a plurality of channels, reference numerals 306A and 307A denote processed BB signals, reference numerals 308A and 308B denote signal groups, reference numeral 309A denotes a first multiplication signal, and reference numeral 310A denotes a second multiplication signal.

The antenna 301 receives the plurality of RF signals 301A from an external base station (not shown) and simultaneously outputs the plurality of RF signals 301A to the LNA 302.

The LNA 302 amplifies the plurality of RF signals 301A output from the antenna 301 to generate the RF input signals 302A of the plurality of channels, and outputs the RF input signals 302A of the plurality of channels to the mixer 305.

The local oscillator 303 generates the plurality of LO signals 303A that correspond to the RF input signals 302A of the plurality of channels output from the LNA 302, and outputs the plurality of LO signals 303A to the first multiplier 309.

The accumulator 304 accumulates the plurality of first multiplication signals 309A output from the first multiplier 309 to generate the LO input signals (accumulated signals) 304A of the plurality of channels, and outputs the LO input signals 304A of the plurality of channels to the mixer 305.

The mixer 305 mixes the RF input signals 302A of the plurality of channels output from the LNA 302 and the LO input signals 304A of the plurality of channels output from the accumulator 304, down-converts the RF input signals 302A of the plurality of channels at the same time to generate the BB signals 305A of the plurality of channels, and outputs the BB signals 305A of the plurality of channels to the first signal processing unit 306.

With respect to the BB signals 305A of the plurality of channels that are output from the mixer 305, the first signal processing unit 306 executes an amplifying process or an attenuating process to adjust signal levels in a dynamic range (input enabled range) of a device (not shown) at a rear stage, which is connected to the wireless communication apparatus 100 of the first embodiment of the present invention, or executes a filtering process to remove an unnecessary noise or an interfering wave. The first signal processing unit 306 outputs the processed BB signals 306A of the plurality of channels to the second multiplier 310.

With respect to the second multiplication signal 310A that is output from the second multiplier 310, the second signal processing unit 307 adjusts a signal level or executes a filtering process to remove an unnecessary noise or an interfering wave. The second signal processing unit 307 outputs the processed BB signals 307A of the plurality of channels to the device at a rear stage.

The code generating unit 308 generates code groups 308A and 308B including a plurality of codes, outputs the code group 308A to the first multiplier 309, and outputs the code group 308B to the second multiplier 310. For example, the code generating unit 308 generates a code string, such as Gold-series PN (Pseudo Noise) codes, which is used in a CDMA (Code Division Multiple Access) scheme.

The first multiplier 309 multiplies the code group 308A output from the code generating unit 308 and the plurality of LO signals 303A output from the local oscillator 303, and outputs a plurality of first multiplication signals 309A as a multiplication result to the accumulator 304. The first multiplier 309 includes a plurality of multiplying units.

The second multiplier 310 multiplies the processed BB signal 306A output from the first signal processing unit 306 and the code group 308B output from the code generating unit 308, and outputs a plurality of second multiplication signals 310A as a multiplication result to the second signal processing unit 307. The second multiplier 310 includes a plurality of multiplying units.

Next, a difference between the third embodiment of the present invention and the first and second embodiments of the present invention will be described.

In the first and second embodiments of the present invention, the BB signals 105A include the down-converted signals of the plurality of channels. However, in order to discriminate the BB signals to process the down-converted signals, for example, an LO frequency needs to be selected, such that signals are arranged so as not to overlap each other on a frequency axis.

Specifically, in the case that a signal RF1 in a signal band of 799 MHz to 801 MHz and a signal RF2 in a signal band of 699 MHz to 705 MHz are simultaneously received. In this case, a signal of 800 MHz is used as an LO signal for down-converting the signal RF1, and a signal of 698 MHz is used as an LO signal for down-converting the signal RF1. At this time, the signal RF1 is down-converted to a BB signal in a band of −1 MHz to 1 MHz (BB1), and the signal RF2 is down-converted to a BB signal in a band of 1 MHz to 3 MHz (BB2). The signals BB1 and BB2 can be discriminately processed so as not to overlap each other on a frequency axis.

However, in the above example, when there is a signal (hereinafter, referred to as "interfering wave signal") RF3 that does not need to be received in a band of 801 MHz to 803 MHz, a signal in a band of 1 MHz to 3 MHz is down-converted using an LO signal of 800 MHz (BB3). Since the signals BB2 and BB3 overlap each other on a frequency axis, the signals BB2 and BB3 cannot be discriminately processed, and the signal RF2 cannot be received. Accordingly, the first and second embodiments of the present invention can be effectively used in a situation where an interfering signal, such as the signal RF3, does not exist.

Meanwhile, in the third embodiment of the present invention, even when the interfering wave signal RF3 exists, a signal can be accurately received. In the above example, a FDMA (Frequency Division Multiple Access) scheme is used in order to discriminate the plurality of BB signals, but a CDMA scheme is used in the third embodiment of the present invention.

Specifically, in FIG. 5, the plurality of codes 308A that are created by the code generating unit 308 and the plurality of LO signals 303A that are generated by the local oscillator 303 are multiplied by the first multiplier 309, and the plurality of encoded LO signals 309A are output. If the plurality of RF signals are down-converted using the plurality of encoded LO signals 309A, a plurality of encoded BB signals are generated. The plurality of encoded BB signals overlaps each other on a frequency axis in the BB signals 305A and 306A. However, in the second multiplier 310, the plurality of encoded BB signals is multiplied by the plurality of codes 308A created by the code generating unit 308 and are decoded. As a result, the signals can be discriminated.

Next, in regards to an operation of the wireless communication apparatus 300 according to the third embodiment of the present invention, the case where the two RF signals RF1 and RF2 are received will be described using expressions.

If it is assumed that the LO signals corresponding to the two RF signals RF1 and RF2 are LO1 and L02 and the codes are a code 1 and a code 2, the encoded LO signals are represented by the following equations 4 and 5.

$$LO1 \cdot code\ 1 \qquad \text{[Equation 4]}$$

$$LO2 \cdot code\ 2 \qquad \text{[Equation 5]}$$

The BB signals that are down-converted by the encoded LO signals are represented by the following equations 6 and 7.

$$(RF1+RF2) \cdot LO1 \cdot code\ 1 \qquad \text{[Equation 6]}$$

$$(RF1+RF2) \cdot LO2 \cdot code\ 2 \qquad \text{[Equation 7]}$$

In the BB signals 305A of the plurality of channels and the processed BB signals 306A, if it is assumed that the above signals simultaneously exist, the following equation 8 is obtained.

$$(RF1+RF2) \cdot LO1 \cdot code\ 1 + (RF1+RF2)\ LO2 \cdot code\ 2 \qquad \text{[Equation 8]}$$

If the code 1 and the code 2 are multiplied by the second multiplier 310, the following equations 9 and 10 are obtained.

$$((RF1+RF2) \cdot LO1 \cdot code\ 1 + (RF1+RF2) \cdot LO2 \cdot code\ 2) \cdot code\ 1 = RF1 \cdot LO1 + RF2 \cdot LO1 \qquad \text{[Equation 9]}$$

$$((RF1+RF2) \cdot LO1 \cdot code\ 1 + (RF1+RF2) \cdot LO2 \cdot code\ 2) \cdot code\ 2 = RF2 \cdot LO2 + RF1 \cdot LO2 \qquad \text{[Equation 10]}$$

($\because$ code 1·code 1=1, code 2·code 2=1, code 1·code 2=0 (code 1 and code 2 are orthogonal).

Since RF1·LO1 and RF2·LO1 have different frequencies, they are filtered by the second signal processing unit 307, and only RF1·LO1 is extracted. This is applicable to RF2·LO2 and RF2·LO1. That is, the desired signals of RF1·LO1 and RF2·LO2 can be discriminated and extracted.

Meanwhile, as in the above example, when the signal RF3 exists, since RF3·LO1 is extracted in the filtering process, the following equations 11 and 12 are obtained.

$$(RF1+RF3) \cdot LO1 = RF1 \cdot LO1 + RF3 \cdot LO1 = RF1 \cdot LO1 \qquad \text{[Equation 11]}$$

$$(RF2+RF3) \cdot LO2 = RF2 \cdot LO2 + RF3 \cdot LO2 = RF2 \cdot LO2 \qquad \text{[Equation 12]}$$

That is, according to the third embodiment of the present invention, even when the signal RF3 exists, RF1·LO1 and RF2 LO2 can be discriminated and extracted, and the signals can be accurately received in all cases.

In the third embodiment of the present invention, for the simplification of description, the case where the received signals are two is described. Even though the received signals are three or more, the same effect can be obtained.

Further, in the third embodiment of the present invention, the controlling unit 303-6 may control gains of the VGAs 303-3 and 303-4 in accordance with any one of the LO signal amplitude, the RF signal amplitude, and the BB signal amplitude or a combination thereof.

Further, in the third embodiment of the present invention, a signal that is related to the BB signal amplitude may be a digital signal which is the AD-converted BB signal. For example, the controlling unit 303-6 controls the gains of the VGAs 303-3 and 303-4 in accordance with magnitude of the LO signal amplitude, such that the LO signal amplitude becomes constant without depending on a process, a power supply voltage, and a temperature. As a result, a gain of the mixer 305 can become constant.

What is claimed is:

1. A wireless communication apparatus comprising:
a local oscillator that generates a plurality of LO (Local Oschillation) signals corresponding to frequencies of a plurality of input RF (Radio Frequency) signals;
an accumulator that accumulates the plurality of LO signals generated by the local oscillator to generate an accumulated signal;
a mixer that mixes the plurality of RF signals and the accumulated signal generated by the accumulator and to generate a plurality of base band signals; and
a first signal processing unit that executes a signal process with respect to the plurality of base band signals generated by the mixer.

2. The wireless communication apparatus according to claim 1,
wherein the local oscillator further includes:
a plurality of phase locked loop circuits that synchronizes input signals with a reference frequency to generate a plurality of frequency signals; and
a plurality of variable gain amplifiers that amplify the plurality of frequency signals generated by the plurality of phase locked loop circuits, and
the accumulator accumulates the plurality of frequency signals that are amplified by the plurality of variable gain amplifiers.

3. The wireless communication apparatus according to claim 2,
wherein the local oscillator further includes:
an LO detecting unit that generates LO detection signals according to output signal amplitudes of the plurality of variable gain amplifiers; and a controlling unit that controls gains of the plurality of variable gain amplifiers in accordance with the LO detection signals generated by the LO detecting unit.

4. The wireless communication apparatus according to claim 1,
wherein the local oscillator further includes:
an oscillator that generates frequency signals having a predetermined frequency;
a frequency dividing unit that divides the frequency signals generated by the oscillator to generate divided frequency signals; and
a plurality of variable gain amplifiers that amplifies the divided frequency signals generated by the frequency dividing unit, and
the accumulator accumulates the plurality of frequency signals that are amplified by the plurality of variable gain amplifiers.

5. The wireless communication apparatus according to claim 4,
wherein the local oscillator further includes:
an RF detecting unit that generates RF detection signals according to the plurality of RF signal amplitudes; and
a controlling unit that controls gains of the plurality of variable gain amplifiers in accordance with the RF detection signals generated by the RF detecting unit.

6. The wireless communication apparatus according to claim 1,
wherein the local oscillator further includes:
an oscillator that generates frequency signals having a predetermined frequency;
a frequency multiplier that performs frequency multiplication on the frequency signals generated by the oscillator to generate frequency multiplication signals; and
a plurality of variable gain amplifiers that amplifies the frequency multiplication signals generated by the frequency multiplier, and
the accumulator accumulates the plurality of frequency signals that are amplified by the plurality of variable gain amplifiers.

7. The wireless communication apparatus according to claim 6,
wherein the local oscillator further includes:
an RF detecting unit that generates RF detection signals according to the plurality of RF signal amplitudes; and
a controlling unit that controls gains of the plurality of variable gain amplifiers in accordance with the RF detection signals generated by the RF detecting unit.

8. The wireless communication apparatus according to claim 1, further comprising:
a second signal processing unit that executes a signal process with respect to the plurality of base band signals processed by the first signal processing unit.

9. The wireless communication apparatus according to claim 8,
wherein the first signal processing unit adjusts signal levels of the plurality of base band signals generated by the mixer in a dynamic range of the second signal processing unit.

10. The wireless communication apparatus according to claim 8,
wherein the first signal processing unit executes a filtering process with respect to the plurality of base band signals generated by the mixer so as to remove an unnecessary noise or an interfering wave.

11. The wireless communication apparatus according to claim 8,
wherein the second signal processing unit adjusts signal levels of the plurality of base band signals that are generated by the mixer.

12. The wireless communication apparatus according to claim 8,
wherein the second signal processing unit executes a filtering process with respect to the plurality of base band signals processed by the first signal processing unit so as to remove an unnecessary noise or an interfering wave.

* * * * *